BLAIR & BEATTY.
Clover Stripper and Rake.
No. 33,512.
2 Sheets—Sheet 1.
Patented Oct. 22, 1861.
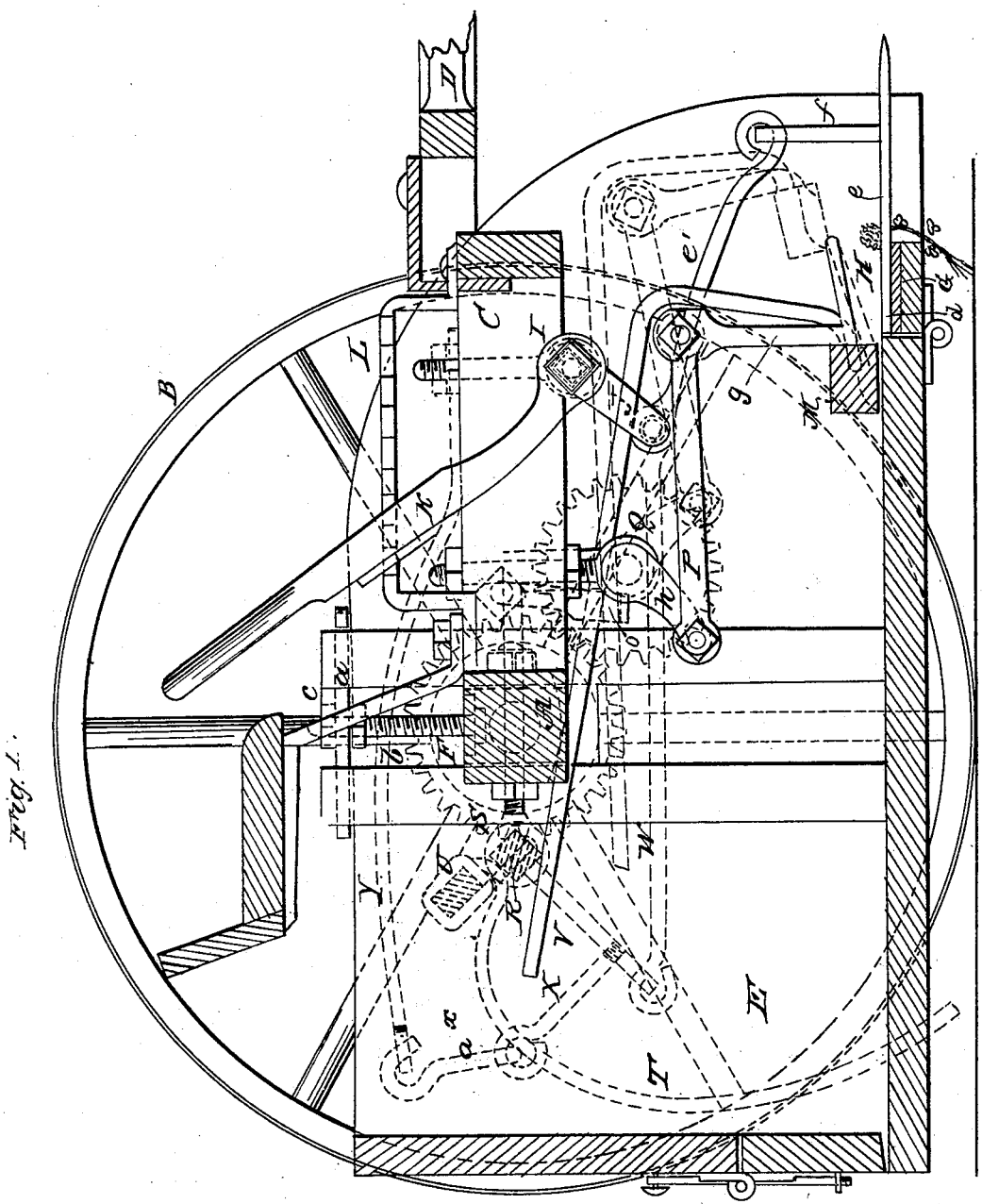

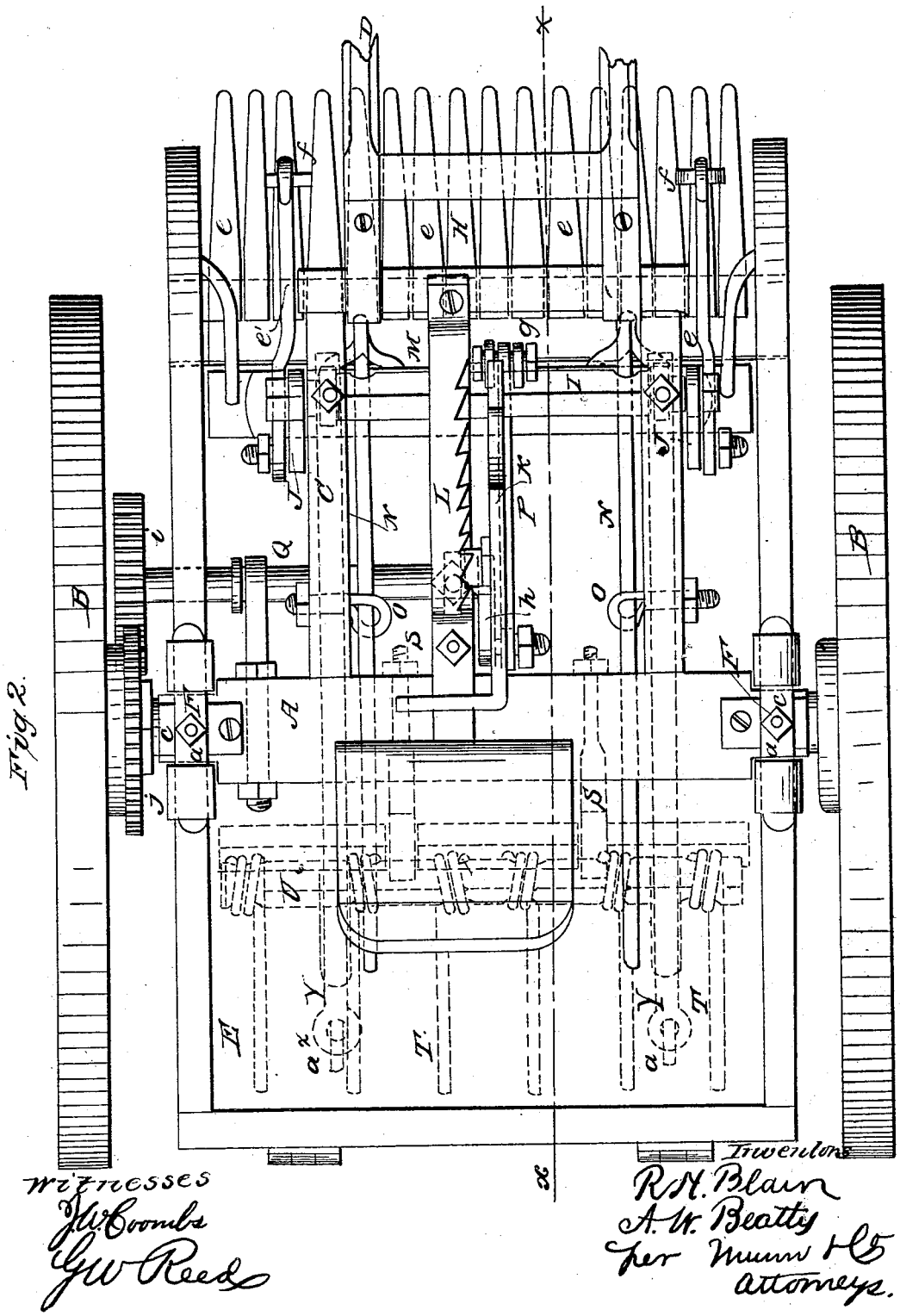

United States Patent Office.

R. H. BLAIR AND A. W. BEATTY, OF SALTSBURG, PENNSYLVANIA.

IMPROVEMENT IN COMBINED CLOVER-STRIPPER AND HAY-RAKE.

Specification forming part of Letters Patent No. 33,512, dated October 20, 1861.

*To all whom it may concern:*

Be it known that we, R. H. BLAIR and A. W. BEATTY, of Saltsburg, in the county of Indiana and State of Pennsylvania, have invented a new and useful Combination of a Clover-Stripper or Harvester and Hay-Rake; and we do hereby declare that the following is a full, clear, and exact description of the same, reference being had to the annexed drawings, making a part of this specification, in which—

Figure 1 is a side sectional view of my invention, taken in the line $x\ x$, Fig. 2. Fig. 2 is a plan or top view of the same.

Similar letters of reference indicate corresponding parts in the two figures.

The object of this invention is to combine a clover-stripper and a horse-rake in such a manner that by a slight adjustment the device may be used in either capacity equally as well as if made specially for either purpose, and thereby obviate the necessity of the farmer purchasing two entire or distinct machines for accomplishing two different kinds of work.

To enable those skilled in the art to fully understand and construct our invention, we will proceed to describe it.

A represents an axle having a wheel, B, on each end, and C is a rectangular frame, which is attached to the axle A at its front side, and has the draft-thills D secured to it.

E represents a box, which is connected to the axle A, or rather suspended thereto, by means of screws F F, which pass through plates $a$ at the top of recesses $b$ in the sides of the box E, said screws having nuts $c$ on them.

To the front end of the bottom of the box E there is attached by a joint, $d$, a bar, G, having teeth $e$ secured to it to form a comb, H. This comb strips the clover-seed from the standing stalks as the implement is drawn along, and the comb may be raised or lowered, as may be required to suit the height of the stalks, by means of a shaft, I, secured to the frame C, and having a crank, J, at each end, said cranks being connected by rods $e'\ e'$ to uprights $f\ f$, attached to the curb H. The shaft I has an arm or lever, K, attached to it, which may be secured at any desired point by means of a rack, L, secured to the frame C.

M is a bar which works over the comb H, and has guide-rods N attached, which are fitted in guides O O, attached to the frame C.

To the bar M there is secured an upright, $g$, the upper end of which is connected by a rod, P, to the crank $l$ of a shaft, Q, the outer end of which has a pinion, $i$, on it, into which a wheel, $j$, on the hub of one of the wheels B gears. By this arrangement a reciprocating movement is given the bar M, the latter moving or working over the comb H, and drawing back the closed head into the comb, and dragging the detached heads into the back part of the box E, the bar M, as it passes forward, rising up free from the comb, and as it passes backward falling or dropping down on the comb, so as to be in contact with it.

In order to convert the machine above described into a horse-rake, all that is required is to remove the box E from the axle, detach the rods $e\ e$ from the cranks J of the shaft I, and also detach the rod P from the uprights $g$ and remove shaft Q. The raking device is then attached to the axle A, and is composed of the following parts: A bar, R, which is fitted so as to turn freely in bolts S S, which bolts pass horizontally through the axle A. This bar R has a series of wire teeth, T, attached, which teeth are coiled around a bar, U, directly back of the bar R. The bar R has two pendants, V V, attached, and the lower ends of these pendants are connected by rods W W to the cranks J of the shaft I. To the lower end of each pendant V there is attached a rod, X, and these rods are connected by links $a^*$ to springs $y\ y$, which are attached to the frame C.

It will be seen from the above description that the shaft I and its lever K are used in both instances—that is to say, for both the clover-stripper and rake, the latter being thrown backward to discharge its load by shoving forward the top of lever K.

The parts required to form the rake are few, and the two devices combined may be furnished at a small cost compared with the cost of two separate machines.

We do not claim separately any of the parts herein described; but

We do claim as new and desire to secure by Letters Patent—

The shaft I, provided with the lever K and attached to the frame C of the axle A, when combined and used in connection with the raking device and clover-stripper, as set forth.

R. H. BLAIR.
A. W. BEATTY.

Witnesses:
ALLEN CROOKS,
T. B. CLEMENTS.